US009790822B2

(12) United States Patent
Tsuneishi et al.

(10) Patent No.: US 9,790,822 B2
(45) Date of Patent: Oct. 17, 2017

(54) HOLLOW POPPET VALVE

(71) Applicant: NITTAN VALVE CO., LTD., Hadano-shi, Kanagawa (JP)

(72) Inventors: Osamu Tsuneishi, Hadano (JP); Masaaki Inoue, Hadano (JP)

(73) Assignee: NITTAN VALVE CO., LTD., Hadano-shi (JP)

( * ) Notice: Subject to any disclaimer, the term of this patent is extended or adjusted under 35 U.S.C. 154(b) by 0 days.

(21) Appl. No.: 15/114,460

(22) PCT Filed: Feb. 10, 2014

(86) PCT No.: PCT/JP2014/053086
§ 371 (c)(1),
(2) Date: Jul. 27, 2016

(87) PCT Pub. No.: WO2015/118690
PCT Pub. Date: Aug. 13, 2015

(65) Prior Publication Data
US 2016/0356186 A1 Dec. 8, 2016

(51) Int. Cl.
*F01L 3/02* (2006.01)
*F01L 3/14* (2006.01)
(Continued)

(52) U.S. Cl.
CPC ............... *F01L 3/14* (2013.01); *B21K 1/22* (2013.01); *F01L 3/02* (2013.01); *F16K 27/0209* (2013.01); *F16K 49/00* (2013.01); *B23P 15/002* (2013.01)

(58) Field of Classification Search
CPC .... F01L 3/14; F01L 3/02; F16K 49/00; F16K 27/0209; B21K 1/22; B23P 15/002
See application file for complete search history.

(56) References Cited

U.S. PATENT DOCUMENTS

| 1,670,965 A | 5/1928 | Heron |
| 2,238,628 A * | 4/1941 | Daisley ............... F01L 3/14 |
| | | 123/188.3 |

(Continued)

FOREIGN PATENT DOCUMENTS

| JP | 52-73306 U | 6/1977 |
| JP | 52-111813 U | 8/1977 |

(Continued)

OTHER PUBLICATIONS

International Search Report dated Mar. 25, 2014, issued in counterpart international application No. PCT/JP2014/053086(2 pages).

*Primary Examiner* — Hung Q Nguyen
(74) *Attorney, Agent, or Firm* — Westerman, Hattori, Daniels & Adrian, LLP

(57) ABSTRACT

With a poppet valve using a coolant, maximum combustion efficiency is realized by adjusting relative values of a heat insulation effect and a heat dissipation effect. From the inside of a head portion (14) to a stem portion (12) of a hollow poppet valve (10) a heat insulating space (S1) and a cooling portion (S2) loaded with a coolant (19), separated from each other by a partition (15), are formed. By properly setting an installation position and a vertical length of the partition (15) according to a type of vehicle for which the valve is used, appropriate heat insulation effect and heat dissipation effect are obtained. Further, by the partition (15), mechanical or thermal strength of the poppet valve in which the heat insulating space (S1) and the cooling portion (S2) are formed is increased.

2 Claims, 7 Drawing Sheets

(51) Int. Cl.
*B21K 1/22* (2006.01)
*F16K 27/02* (2006.01)
*F16K 49/00* (2006.01)
*B23P 15/00* (2006.01)

(56) References Cited

U.S. PATENT DOCUMENTS

| | | | | |
|---|---|---|---|---|
| 2,371,548 | A | * | 3/1945 | Saffady ............... F01L 3/14 123/188.3 |
| 5,769,037 | A | * | 6/1998 | Ohtsubo ............. F01L 3/14 123/188.9 |
| 2004/0112327 | A1 | * | 6/2004 | Spiegel ............... F01L 1/32 123/294 |

FOREIGN PATENT DOCUMENTS

| | | |
|---|---|---|
| JP | 55-25679 U | 2/1980 |
| JP | 61-106677 U | 7/1986 |
| JP | 4-65907 U | 6/1992 |
| JP | 4-311611 A | 11/1992 |
| JP | 2003-307105 A | 10/2003 |
| JP | 2012-72748 A | 4/2012 |

* cited by examiner

HOLLOW POPPET VALVE

TECHNICAL FIELD

The present invention relates to a hollow poppet valve including a heat insulating H space and a hollow H portion formed from a head portion to a stem portion of a valve main body.

BACKGROUND

Patent Literatures 1 and 2, etc., describe poppet valves each including a head portion formed integrally with a stem end portion. A poppet valve to be used in an internal combustion drives an engine by opening and closing an intake passage or an exhaust port by being seated on a valve seat of a cylinder head to which the intake, passage or the exhaust port is connected.

Normally, in an internal combustion, the higher the internal temperature of a combustion chamber, the higher the combustion efficiency. Heat in the combustion chamber is dissipated to the outside through the poppet valve in many cases. Therefore, a space is formed on or near a head surface of the poppet valve which comes into contact with the combustion chamber, and by forming a vacuum in this space, filling an inert gas, or filling a material having lower heat conductivity than a material forming the poppet valve, a heat insulating space is formed to suppress dissipation of heat inside, the combustion chamber (refer to Patent Literature 1).

By thus forming the heat insulating space, the temperature inside the combustion chamber becomes high, and if the temperature inside the combustion chamber is excessively high, knocking occurs and a predetermined engine output is not obtained, resulting in deterioration of fuel efficiency (deterioration of engine performance). Therefore, to lower the temperature inside, the combustion chamber, as a method for positively conducting heat (generated in the combustion chamber is a valve (method for increasing the heat dissipation effect of the valve), various hollow valves having a hollow portion loaded with a coolant together with an inert gas have been proposed.

In the poppet valve described in Patent Literature 2, a hollow portion is formed from the head portion to the stem portion, and this hollow portion is loaded with a coolant with heat conductivity higher than that of the base material of an engine valve (for example, metallic sodium whose melting point is approx. 98° C.) together with an inert gas.

The hollow portion of the engine valve extends from the inside of the head portion to the inside of the stem portion, and the amount of coolant to be loaded in the hollow portion is accordingly increased, so that the heat conductivity of the engine valve (hereinafter, referred to as heat dissipation effect of the valve) can be improved. However, the stem portion of the engine valve is reduced in volume since the follow portion is formed therein, so that if the heat dissipation effect is excessively great, the temperature of the stem portion excessively rises. An intake valve of engine valves takes-in a mixture of gasoline and air, and if the surface temperature of the intake valve is excessively high, the mixture to come into contact with this intake valve expands in volume, and the amount of mixture that can be taken-in in one cycle decrease, so that engine efficiency is deteriorated. In addition, the exhaust valve of the engine valves is exposed to a high temperature as compared with the intake valve, and in particular, a neck portion easily deteriorates in strength.

CITATION LIST

Patent Literatures

Patent Literature 1: Japanese Published Unexamined Patent Application No. 2012-72748
Patent Literature 2: Japanese Published Unexamined Utility Model Application No. S61-106677

SUMMARY OF THE INVENTION

Problem to be Solved by the Invention

In such a poppet valve r coolant, it is desirable to attain maximum combustion efficiency by adjusting relative values of the heat insulation effect and the heat dissipation effect. In the poppet valve described in Patent Literature 2, a heat insulating space 9 and a cooling chamber 7 are formed, these are separated from each other by a head surface portion A. In this poppet valve, the heat insulating space 9 that generates a heat insulation effect and the cooling chamber 7 that generates a heat dissipation effect are present, however, the head surface portion A that separates the heat insulating space and the cooling chamber is a member specific to the valve, and there is no idea that this member is controlled to adjust the heat insulation effect and the heat dissipation effect. That is, the forms of the heat insulating space 9 and the cooling chamber 7 are fixed, and accordingly, their volumes are fixed, so that the heat insulation effect and the heat dissipation effect cannot be set to appropriate relative proportions suitable for each type of vehicle, etc.

The present invention was made based on the above-described inventor's knowledge on prior literatures, and an object thereof is to provide a hollow poppet valve that can significantly improve combustion efficiency by suppressing dissipation of thermal energy obtained in a combustion chamber to the valve.

Solution Means

In order to attain the above-described object, a hollow poppet valve according to the present invention (claim 1) is configured so that, in a hollow poppet valve including a head portion formed integrally with one end side of a stem portion, a head-side hollow portion and a stem-side hollow portion separated by a partition are formed in the valve, and in the head-side hollow portion, a heat insulating portion is configured by containing a gas or a material having lower heat conductivity than a valve forming metal, and the stem-side hollow portion is loaded with a coolant.

(Operation) When the poppet valve configured as described above is used as an engine valve, in the head-side hollow portion (a heat insulating space or a large-diameter hollow portion) lower than the partition, due to a low heat conductivity of the space, dissipation of heat inside the combustion chamber is suppressed and the temperature inside the combustion chamber is kept high. On the other hand, in a cooling portion higher than the partition, a coolant such as metallic sodium cools an outer wall surface of the cooling portion and a mixture around the cooling portion. The cooling portion is formed to be hollow, so that it is deteriorated in fatigue strength and easily damaged by high heat, however, the cooling portion is cooled by the coolant, so that there is little, risk of thermal damage. This is remarkable at the neck portion of the exhaust valve at which the temperature of the mixture is high. In the case where the poppet valve is an intake valve, a mixture to be taken-in expands by heating, and the amount of mixture to be taken-in in one cycle decreases and the fuel efficiency deteriorates. However, since the mixture is cooled by the coolant, the mixture is sufficiently supplied in volume and the engine is smoothly actuated. That is, deterioration in combustion efficiency due to a decrease in intake amount caused by volume expansion of the intake air (mixture) around the valve when the intake air is exposed to heat from the valve is suppressed, and further, in combination with the above-described suppression of thermal energy dissipation, the combustion efficiency can be significantly improved.

In the case of the present invention, since the heat insulating space and the cooling portion are separated by the partition, by properly setting a position in the up-down direction and a length in the up-down direction of this partition according to the type of vehicle for which the valve is used, etc, appropriate heat insulation effect and heat dissipation effect are obtained. Further, since a hollow structure is obtained by forming the heat insulating space and the cooling portion, although the mechanical strength of the poppet valve is insufficient, the mechanical strength is increased by the partition.

According to an embodiment, in the hollow poppet valve, a heat insulating layer is formed on at least one of a combustion chamber-side surface of the head portion, an outer circumferential surface from the head portion to the stem portion, and a head-side hollow portion inner wall.

(Operation) In this hollow poppet valve, a heat insulating layer made of ceramics, etc., is formed on both or either of the combustion chamber-side surface of the head portion which is intrinsically easily exposed to a high temperature, for example, a bottom surface of the head portion shell and a cap lower surface, and the outer circumferential surface from the head portion to the stem portion, for example, a fillet portion of the poppet valve, so that exposure of each member to a high temperature is avoided, and high-temperature stability is obtained. In addition, by forming a heat insulating layer on the head-side hollow portion inner wall as well, heat that passed through the heat insulating layer formed on the head portion shell as restrained from being conducted to the head-side hollow portion, and the heat insulation effect can be further increased.

According to another embodiment, in the hollow poppet valve, the partition is formed integrally with a valve main body.

(Operation) When the valve main body and the partition are integrally formed, a poppet valve that has no joint interface, has high rigidity, and is highly resistant to thermal and mechanical stresses, and can be used in severe environments, can be provided.

According to an embodiment, in the hollow poppet valve, the partition is configured by fixing a columnar body having an outer diameter substantially equal to an inner diameter of the stem portion to a predetermined position by joining such as inserting and fitting or welding to the inside of the cooling portion.

(Operation) In this mode in which the partition is configured by inserting and fitting a columnar body into the cooling portion, the same level of rigidity as in the case of integral forming cannot be obtained, however, the inserting and fitting position of the columnar body and the vertical length of the columnar body can be easily changed, and further, the material is also easily changed, so that the required heat insulation effect and heat dissipation effect are easily obtained.

According to another embodiment, in the hollow poppet valve, a cap member that defines a bottom surface of the head-side hollow portion is joined to the combustion chamber side of the head portion.

(Operation) In this mode in which a cap is joined, the head-side hollow portion is easily filled with a desired heat insulating material or gas, and by joining the cap in a vacuum or under a reduced pressure, the head-side hollow portion can be kept vacuum or at reduced pressure under which heat conductivity is low.

In one embodiment, a heat insulation effect is obtained at the heat insulating portion, a heat dissipation effect is obtained at the cooling portion, and by setting at least one of a position in the up-down direction and a length in the up-down direction of the partition, relative values of the heat insulation effect and the heat dissipation effect can be adjusted.

In another embodiment, in a method for adjusting relative values of a heat insulation effect and a heat dissipation effect of a hollow poppet valve configured so that a head portion is formed integrally with one end side of a stem portion, a head-side hollow portion and a stem-side hollow portion separated from each other by a partition are formed, in the head-side hollow portion, a heat insulating portion that can exert the heat insulation effect by containing a gas or a material having lower heat conductivity than a valve forming metal is configured, and in the stem-side hollow portion, a cooling portion that can exert the heat dissipation effect by being loaded with a coolant, a method for adjusting relative values of the heat insulation effect and the heat dissipation effect by setting at least one of a position in the up-down direction and a length in the up-down direction of the partition, is provided.

(Operation) In the embodiment, as described above, by changing and properly setting the installation position and vertical length of the partition according to a type of vehicle for which the valve is used, etc., appropriate heat insulation effect and heat dissipation effect are obtained.

Effects of the Invention

With the hollow poppet valve according to the present invention, the installation position and vertical length of the partition are easily changed, and by properly setting these according to the type of vehicle for which the valve, is used, etc., appropriate heat insulation effect and heat dissipation effect are obtained. Further, by the partition, mechanical or thermal strength of the poppet valve in which a heat insulating space and a cooling portion are formed is increased.

With the hollow poppet valve according to an embodiment, a heat insulating layer with low heat conductivity is formed on at least one of a combustion chamber-side surface of the head portion, an outer circumferential surface from the head portion to the stem portion, and a head-side hollow portion inner wall which are easily exposed to a high temperature, and accordingly, thermal damage to these portions due to heat of a combustion gas inside the combustion chamber and the exhaust port are avoided, and by forming the heat insulating layer on an inner wall on the combustion chamber side of the head-side hollow portion, conduction of heat from the combustion chamber side to the head-side hollow portion is suppressed. Further, by forming the heat insulating layer on the inner wall on the stem portion side of the head-side hollow portion, conduction of heat inside the combustion chamber to the stem portion side is suppressed.

With the hollow poppet valve according to another embodiment, in the poppet valve including the partition and a valve main body which are integrally formed, contribution to improvement in strength in the vicinity of a boundary between the stem portion and the head portion which greatly deforms when being formed, is increased.

With the hollow poppet valve according to an embodiment, volumes of the heat insulating space and the cooling portion can be comparatively freely set by the partition, and therefore, the heat insulation effect and the heat dissipation effect can be made close to their optimum values.

With the hollow poppet valve according to another embodiment, a cap member is joined to define a bottom surface of the head-side hollow portion, so that it is easy to fill the head-side hollow portion with a desired gas or heat insulating material and keep the head-side hollow portion in a vacuum or under a reduced pressure.

With the hollow poppet valve according to an embodiment, by properly setting an installation position and a vertical length of the partition, appropriate heat insulation effect and heat dissipation effect are obtained.

Similarly, even with the method for manufacturing a hollow poppet valve according to another embodiment, by properly setting an installation position and a vertical length of the partition, appropriate heat insulation effect and heat dissipation effect are obtained.

BEST MODE FOR CARRYING OUT THE INVENTION

Next, an embodiment of the present invention is described based on examples.

Figure 1:
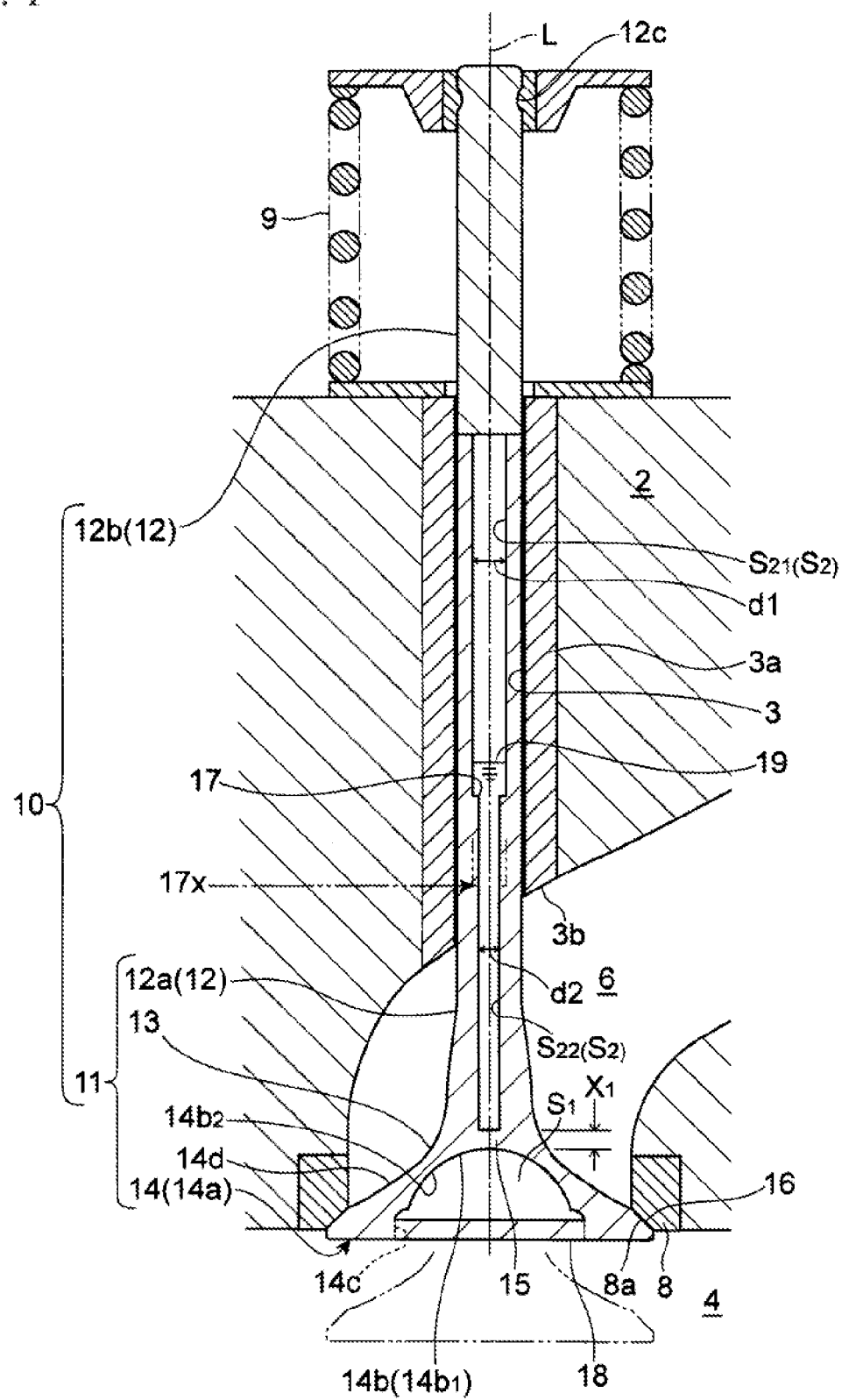
FIG. 1 is a longitudinal sectional view of a hollow poppet valve according to a first example of the present invention.

FIG. 1 shows a hollow poppet valve for an internal combustion according to a first example of the present invention.

In FIG. 1, the reference sign 10 denotes a hollow poppet valve which is made of heat-resistant alloy and includes a valve head portion 14 formed integrally with one end side of a valve stem portion 12 extending straight via a rounded fillet portion. 13 whose outer diameter gradually and on an outer circumference of the valve head portion 14, tapered face portion 16 is provided.

A hollow portion inside the hollow poppet valve 10 is separated into a large-diameter hollow portion (head-side hollow portion) S1 on the valve head portion 14 side and a small-diameter hollow portion (stem-side hollow portion) 32 on the valve stem portion 12 side by a partition 15 with a thickness x1 provided at a position corresponding to the fillet portion 13 between the valve head portion 14 and the valve stem portion 12, and the separated large-diameter hollow portion S1 is filled with a gas such as air, nitrogen, and argon, etc., at a normal pressure, or kept in a vacuum or under a reduced pressure, and the small-diameter hollow portion S2 is loaded with a coolant 19 together with an inert gas. It is desirable to keep the large-diameter hollow portion S1 in a vacuum under which heat conductivity is low.

In detail, inside the valve head portion 14, the spherical (domed) large-diameter hollow portion S1 that has spherical upper end surface 14b1 and a tapered outer circumferential surface (inclined surface) 14b2 substantially following an outer shape of the valve head portion 14 is provided, and on the other hand, inside the valve, stem portion 12, the thin and long columnar small-diameter on S2 extending to the vicinity of the spherical sealing surface 14b1 of the diameter hollow portion S1 is provided perpendicularly to the upper end surface 14b1 of the large-diameter hollow portion, and between the small meter hollow portion S2 and the large-diameter hollow portion S1, a partition 15 with a thickness x1 formed integrally with the valve head portion 14 is provided.

In greater detail, a stem-integrated shell (hereinafter, referred to as shell, simply) 11 as a valve intermediate product including a head portion shell 14*a* formed integrally with one end side of the stem portion 12*a* and a hole equivalent to the small-diameter hollow portion S2 opening the other end side of the stem portion 12*a*, a discoid cap 18 joined to an opening-side inner circumferential surface 14*c* in a spherical recess 14*b* of the head portion shell 14*a* of the shell 11, and a stem end member 12*b* coupled to the stem portion 12*a* of the shell 11, constitute the hollow poppet valve 10 including the hollow portion S1 inside the valve head portion 14 and the hollow portion S2 inside the valve stem portion 2, separated from each other via the partition 15, and the hollow portion S1 is filled with a gas such as air, nitrogen, and argon, etc., and the hollow portion is loaded with a coolant 19 together with an inert gas. The loading amount of the coolant 19 is, for example, approximately ½ to ⅘ of the volume of the hollow portion S2.

In FIG. 1, the reference sign 2 denotes a cylinder head, the reference sign 6 denotes an exhaust port extending from a combustion chamber 4, and on a rim portion of an opening of the exhaust port 5 leading to the combustion chamber 4, a toric valve seat insert 8 having a tapered surface 8a with which the valve seat face 16 of the valve 10 can come into contact is provided. The reference sign 3 denotes a valve insertion hole provided in the cylinder head 2, and the valve insertion hole 3 is configured by a cylindrical valve guide 3a with which the stem portion 12 of the valve 10 comes into sliding contact. The reference sign 9 denotes a valve spring that biases the valve 10 in a valve closing direction (upward in FIG. 1), and the reference sign 12c denotes a cotter groove provided on an end portion of the valve stem portion 12.

For the cap 18, a material with low heat conductivity (for example, inconel, etc.) is used, and the shell 11 that is a portion to be exposed to a high-temperature gas in the combustion chamber 4 and the exhaust port 6 is made of heat-resistant steel (for example, SUH 35, etc.). On the other hand, the stem end member 12b that is not required to be as heat-resistant as the shell 11 and the cap 18 while being required to have mechanical strength is made of a more inexpensive material (for example, SUH 11, etc.) than the heat-resistant steel used for the shell 11.

The hollow portion S1 lower than the partition 15 of the hollow poppet valve 10 configured as described above is normally filled with air, however, this space may be loaded with a heat insulating material. As the heat insulating material, heat-resistant metal or carbon can be used, and the heat insulating material can be used as a filter with a porosity of approximately 25 to 80% made of, for example, stainless-steel-made nonwoven fabric, short fiber, long fiber, powder, or metal mesh, or microspheres of glassy carbon. As another detailed example, a laminated metal nonwoven filter formed by laminating a reinforcing metal mesh and a protective metal mesh on a metallic nonwoven fabric, can be used by way of example. This heat insulating material is easily handled. Further, the heat insulating material may be made of metal woven fabric obtained by three-dimensionally forming a heat-resistant metal yarn.

By filling the hollow portion S1 with air or loading the hollow portion with a heat insulating material, the heat conductivity of the hollow portion S1 lowers, and accordingly, the amount of energy generated by fuel combustion to be drawn as heat to the outside via the valve main body is reduced (cooling loss is reduced).

The coolant such as metallic sodium inside the hollow portion S2 higher than the partition 15 cools the outer wall surface of the cooling portion and the mixture around the cooling portion. The cooling portion is formed to be hollow, so that it is deteriorated in high-temperature strength and easily damaged by a high temperature, however, the cooling portion is cooled by the coolant an that there is little risk or thermal damage.

The small-diameter hollow portion S2 consists of a small-diameter hollow portion S21 that has a comparatively large inner diameter d1 and is close to the valve stem end portion, and a small-diameter hollow portion S22 that has a comparatively small inner diameter d2 (d2<d1) and is close to the valve head portion 14, and between the small-diameter hollow portions 321 and 322, a toric stepped portion 17 is formed, and the coolant 19 is loaded to a position beyond the stepped portion 17.

Therefore, when the coolant 19 inside the small-diameter hollow portion S2 is moved in the up-down direction by inertia applied when the valve 10 opens or closes, a turbulence Is generated near the stepped Portion 17 and agitates the coolant 19, and accordingly, the heat dissipation effect (heat conductivity) at the valve stem portion 12 is improved.

As shown in FIG. 1, the stepped portion 17 inside the small-diameter hollow portion S2 is provided at a position substantially corresponding to an end portion 12 on a side facing the exhaust port 6 of the valve guide 3, and the small-diameter hollow portion S21 having a large inner diameter and close to the stem end portion is formed to be long in an axial direction, and accordingly, without deteriorating the durability of the valve 10, the contact area between the valve stem portion 12 and the coolant 19 is increased and the heat transfer efficiency of the valve stem portion 12 is increased, and the wall defining the small-diameter hollow portion S21 becomes thinner and the valve 10 becomes light in weight. That is, the stepped portion 17 inside the small-diameter hollow portion S2 is provided at a predetermined position that is not inside the exhaust port 6 (a predetermined position at which the thin wall defining the small-diameter hollow portion S21 of the valve stem portion 12 is hardly influenced by heat inside the exhaust port 6) in a state where the valve 10 fully opens (moves down) as shown by the imaginary line. In FIG. 1. The reference sign 17X in FIG. 1 denotes the position of the stepped portion 17 in a state where the valve 10 fully opens moves down).

In detail, the fatigue strength of metal deteriorates as the temperature rises, so that a region close to the valve head portion 14 in the valve is a portion always inside the exhaust port exposed to high heat, needs to be formed to have a thickness sufficient enough to bear deterioration in fatigue strength. On the other hand, heat in the combustion chamber 4 and the exhaust port 6 is transmitted via the coolant 19 to a region close to the stem end portion in the valve stem portion 12, which is a portion away from a heat source, and always in sliding contact with the valve guide 3a, however, the transmitted heat is immediately released to the cylinder head 2 via the valve guide 3a, so that this region hardly reaches a temperature as high as the temperature in the region close to the valve head portion 14.

That is, the region close to the stem end portion in the valve stem portion 12 is less deteriorated in fatigue strength than the region close to the valve head portion 14, so that even if the region close to the stem end portion is formed to be thin (the inner diameter of the small-diameter hollow portion S21 is formed to be large) there is no problem with strength (durability to fatigue breaking, etc.)

Therefore, in the present example, first, by increasing the surface area of the entire small-diameter hollow portion S2 (contact area with the coolant 10) by forming the inner diameter of the small-diameter hollow portion S21 to be large, the heat conduction efficiency in the valve stem portion 12 is improved. Second, by increasing the volume of the entire small-diameter hollow portion S2, the total weight of the valve 10 is reduced.

The stem end member 12b of the valve is not required to be as heat-resistant as the shell 11, so that by using an inexpensive material (for example, SUH 11, etc.) having lower heat resistance than the material of the shell 11, the valve 10 can be provided inexpensively.

As described in Patent Literature 2, a hollow valve configured to be hollow from the valve stem portion to the valve head portion has lower strength against bending and twisting of the valve stem portion than a hollow valve including a valve stem portion formed of a solid body, however, in the valve 10 according to the present example, the partition 15 that separates the small-diameter hollow portion S2 and the large-diameter hollow portion S1 is formed integrally with the valve head portion 14, and compensates deterioration in strength against bending and twisting of the valve stem portion 12, and accordingly, the durability is excellent.

Figure 2:
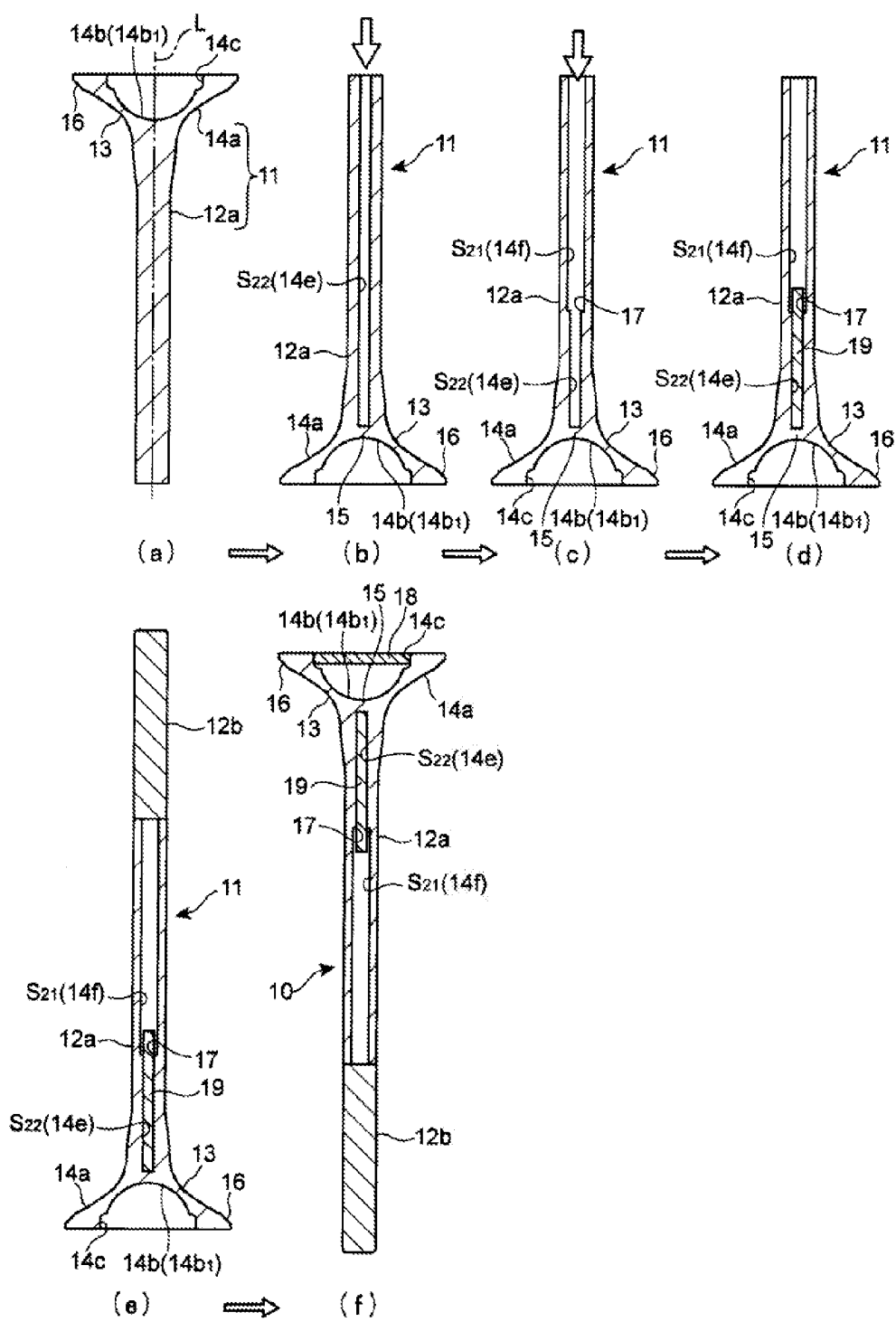
FIG. 2 are views showing steps of manufacturing the hollow poppet valve according to the first example, FIG. 2(*a*) shows a hot forging step of forging a shell as a valve intermediate product, FIG. 2(*b*) shows a boring step of boring a hole equivalent to a small-diameter hollow portion close to a head portion, FIG. 2(*c*) shows a boring step of boring a hole equivalent to a small-diameter hollow portion close to a stem end portion, FIG. 2(*d*) shows a coolant loading step of filling the small-diameter hollow portion with a coolant, FIG. 2(*e*) shows a coupling step of coupling a stem end member (small-diameter hollow portion sealing step), and FIG. 2(*f*) shows a step of joining a cap to an opening-side inner circumferential surface of a recess (large-diameter hollow portion) of a head portion shell (large-diameter hollow portion sealing step).

Next, steps of manufacturing the hollow poppet valve 10 according to the first example are described based on FIG. 2.

First, as shown in FIG. 2(a), through a hot forging step, the shell 11 in which the head portion shell 14a provided with a spherical recess 14b and the stem portion 12a are integrally formed, is formed. The bottom surface 14b1 of the spherical recess 14b in the head portion shell 14a is formed of a spherical surface perpendicular to the stem portion 12a (central axis L of the shell 11).

As the hot forging step, either of extrusion forging in which a die is replaced in order and by which the shell 11 is manufactured from a block of heat-resistant steel, or upset forging in which after a spherical portion is upset on an end portion of a rod material made of heat-resistant steel by an upsetter, (the head portion shell 14a of) the shell 11 is forged by using a die, can be adopted. In the hot forging step, between the head portion shell 14a and the stem portion 12a of the shell 11, a rounded fillet portion 13 is formed, and on the outer circumferential surface of the head portion shell 14a, a tapered face portion 16 is formed.

Next, as shown in FIG. 2b), the hole 14e equivalent to the small-diameter hollow portion S22 is bored by drilling, from an end portion side of the stem portion 12a of the shell 11 (boring step). Through this boring step, the partition 15 that separates the recess 14b of the head portion shell 14a constituting the large-diameter hollow portion S1 and the hole 14e on the stem portion 12a side constituting the small-diameter hollow portion S22, is formed.

Next, as shown in FIG. 2(c), from the end portion side of the stem portion 12a of the shell 11, the hole 14f equivalent to the small-diameter hollow portion S21 is bored by drilling, and the stepped portion 17 is formed (boring step).

Next, as shown in FIG. 2(d), the stem portion 12a of the shell 11 is disposed so as to turn upward, and the insides of the holes 14e and 14f equivalent to the small-diameter hollow portion S2 are filled with a predetermined amount of the coolant (solid) 19 (coolant loading step).

Next, as shown in FIG. 2(e), under an argon gas atmosphere, a stem end member 12b is coupled to the stem portion 12a of the shell 11 (small-diameter hollow portion sealing step).

Last, as shown in FIG. 2(f), the large-diameter hollow portion S1 of the valve 10 is sealed (large-diameter hollow portion sealing step) by joining (for example, circumferential surface 14c of the recess 14b of the head portion shell 14a under an argon gas atmosphere, and a process of forming the cotter groove 12c (refer to FIG. 1) on the stem end portion is performed, and accordingly, the valve 10 is completed. To join the cap 18, electron beam welding or laser welding, etc., can be adopted instead of resistance welding. When the cap 18 is joined under a reduced pressure instead of the above-described argon gas atmosphere, the inside of the large-diameter hollow portion S1 can be depressurized.

Figure 3:
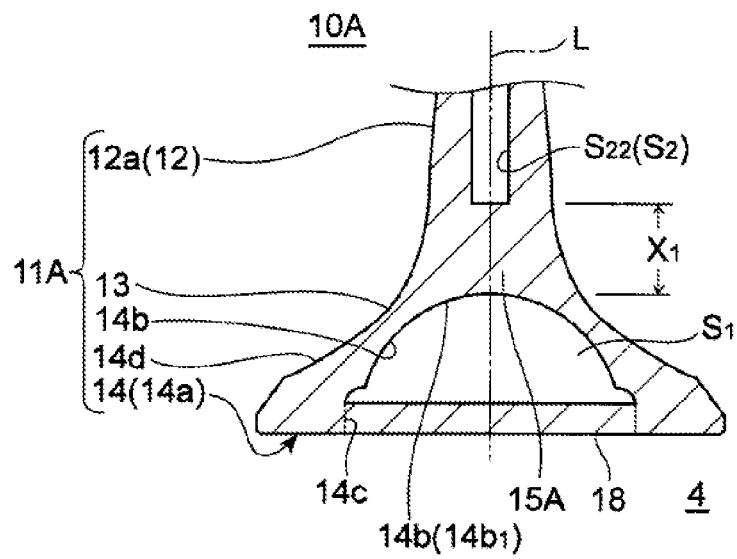
FIG. 3 is a longitudinal sectional view of a hollow poppet valve according to a second example of the present invention.

FIG. 3 shows a hollow poppet valve for an internal combustion, according to a second example of the present invention.

The hollow poppet valve 10A (shell 11A) according to the second example has the same configuration as in the first example except that a thickness of a partition 15A is set to x2, thicker than the thickness x1 of the partition 15 of the first example (x1<x2). The same member as in the first example is designated by the same reference sign, and accordingly, overlapping description thereof is omitted. In the poppet valve according to the second example, since the thickness (length in the up-down direction) of the partition 15A is thicker than in the first example, the fillet portion 13 that is comparatively low in mechanical strength is strengthened. Thus, by properly adjusting the thickness of the partition 15A, necessary and sufficient strength can be obtained.

To manufacture the hollow poppet valve 10A according to the second example shown in FIG. 3, a step of shortening the boring distance when drilling to bore the hole 14e in the boring step in FIG. 2(b) by (x2−x1) is added.

Figure 4:
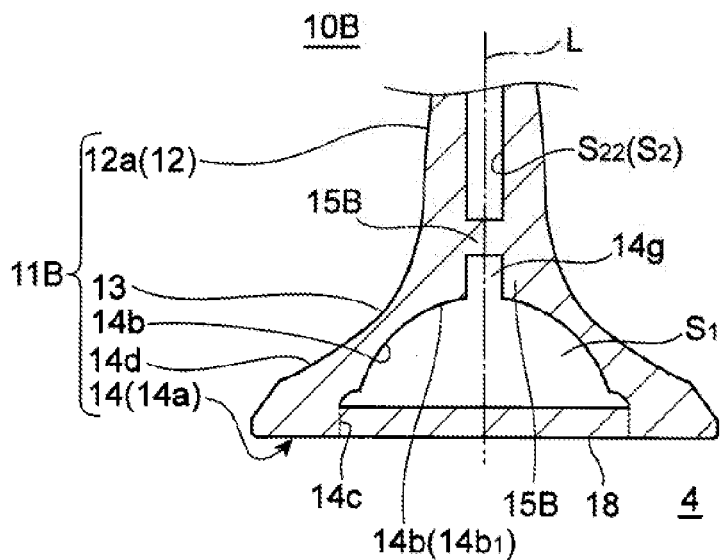
FIG. 4 is a longitudinal sectional view of a hollow poppet valve, according to a third example of the present invention.

FIG. 4 shows a hollow poppet valve according to a third example of the present invention. The hollow poppet valve 10B according to the third example is a modification of the second example, and the same member as in the second example is designated by the same reference sign and description is omitted in the third example, at the vertex of the spherical upper end surface 14b1, a recessed portion 14g is formed along the central axis L, and a partition 155 is formed between the recessed portion 14g and the small-diameter hollow portion S2.

In this third example, by adjusting the length of the recessed portion 14g, the volume of the recessed portion 14g is increased or decreased to optimally set the volume of the heat insulating space including the recessed portion and the large-diameter hollow portion S1, and accordingly, desired heat insulation efficiency is obtained.

Figure 5:
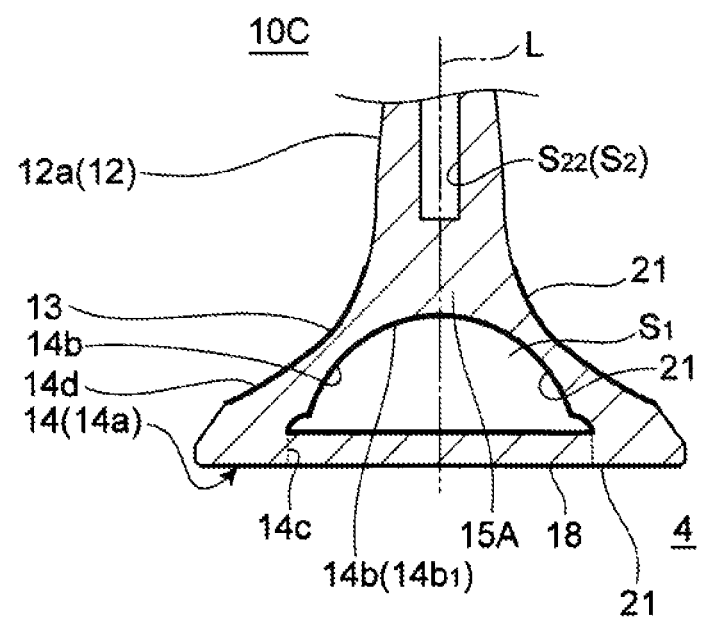
FIG. 5 is a longitudinal sectional view of a hollow poppet valve according to a fourth example of the present invention.

FIG. 5 shows a hollow poppet valve according to a fourth example of the present invention. The hollow poppet valve 10C according to the fourth example is a modification of the above-described second example, and the same member as in the second example is designated by the same reference sign and description is omitted. In the fourth example, a bottom surface of the head portion shell 14a and a lower surface of the cap 18, the rounded fillet portion 13, and an inner wall of the head-side hollow portion (S1) are coated with a heat insulating layer 21 made of ceramics, etc., by, for example, thermal spraying. This heat insulating layer 21 may be coated on at least one of the bottom surface of the head portion shell 14a and the lower surface of the cap 18, the fillet portion 13, and the inner wall of the head-side hollow portion. Here, the inner wall of the head-side hollow portion (31) includes the domed spherical recess (14b) of the head-side hollow portion (S1) and the upper surface of the cap 18, and the heat insulating layer 21 is formed on all or a part of these.

The bottom surface of the head portion shell 14a and the lower surface of the cap 18 in the hollow poppet valve 10C are exposed to a high temperature of the combustion chamber 4, and when the poppet valve is an exhaust valve, the fillet portion 13 is exposed to the mixture at a high temperature inside the exhaust port. By forming the heat insulating layer 21 on these portions, the heat resistance is improved, and high-temperature stability is obtained. By forming the heat insulating layer 21 on the upper surface of the cap 18 of the inner wall of the head-side hollow portion, heat that cannot be insulated by the heat insulating layer 21 on the lower surface side of the cap 18 is insulated, and heat can be restrained from being conducted to the head-side hollow portion. By the heat insulating portion formed on the spherical recess (14b), heat inside the head-side hollow portion (S1) is restrained from being transmitted toward the stem portion.

Figure 6:
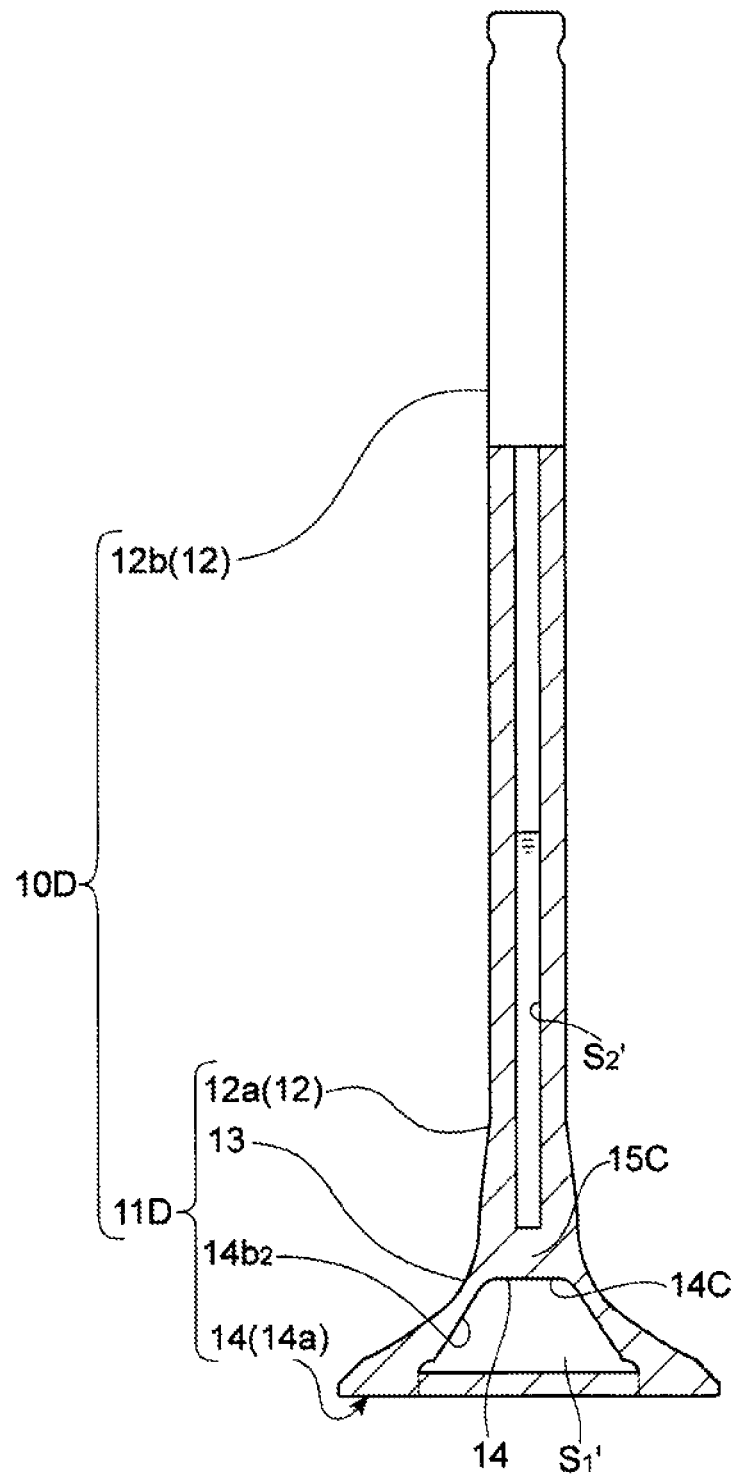
FIG. 6 is a longitudinal sectional view of a hollow poppet valve, according to a fifth example of the present invention.

FIG. 6 shows a hollow poppet valve according to a fifth example of the present invention. The hollow poppet valve 10D according to the fifth example is a modification of the first example, and the same member as in the first example is designated by the same reference sign and description is omitted. In the fifth example, a large-diameter hollow portion S1' is formed into not a semispherical shape but substantially a truncated cone shape, and therefore, a upper end surface of the large-diameter hollow portion S1' is formed as a flat surface 14c, and the stepped portion 17 in the first example is not formed on a small-diameter hollow portion S2'. Even in this fifth example, as in the case of each example described above, the large-diameter hollow portion S1' and the small-diameter hollow portion S2' are comparted by a partition 15C, and respectively exert a heat insulation effect and a cooling effect. No convection is generated inside the small-diameter hollow portion S2', however, manufacturing is accordingly simplified.

Figure 7:
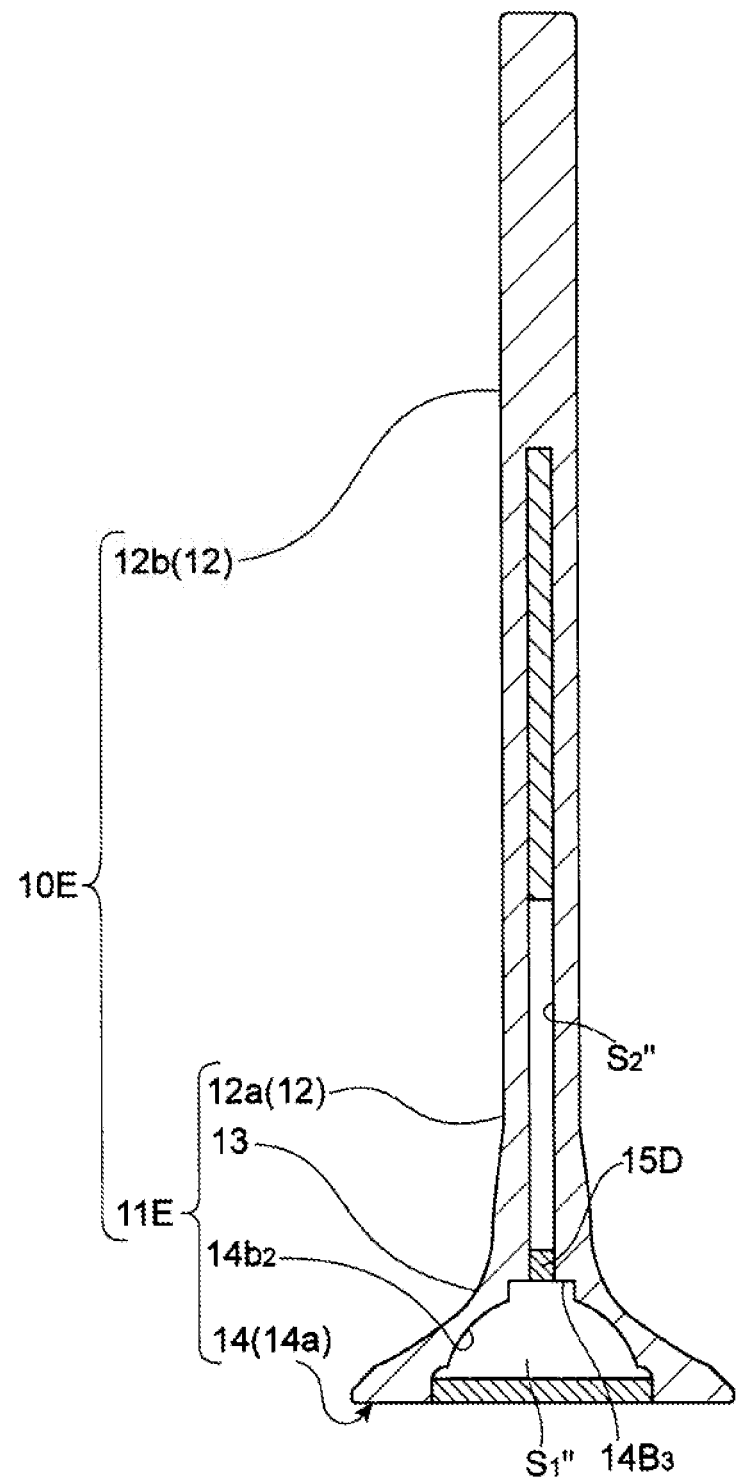
FIG. 7 is a longitudinal sectional view of a hollow poppet valve according to a sixth example of the present invention.

FIG. 7 shows a hollow poppet valve according to a sixth example of the present invention. In the aforementioned example, in the hollow poppet valve, the small-diameter hollow portion inside the valve stem portion and the large-diameter hollow portion inside the valve head portion are separated the partition formed integrally with the shell. On the other hand, in the hollow poppet valve 10E according to the sixth example, a small-diameter hollow portion S2" inside the valve stem portion 12 and a large-diameter hollow portion S1" inside the valve head portion 14 are separated by a plug (columnar body) 15D made of heat-resistant steel that is the same material as the material of the shell the fixed to the inside of the opening of the small-diameter hollow portion S2" leading to the large-diameter hollow portion S1" and constituting the partition, or a material (for example, inconel, etc) having lower heat conductivity than the heat-resistant steel. This plug 15D is fixed to a predetermined position by being press-fitted (inserted) from the large diameter hollow portion S1" direction. In this sixth example, a stepped flat portion 14b3 is formed in the vicinity of the vertex of an inclined outer circumferential surface 14b7 of the large-diameter hollow portion S1.

Other components are the same as those of the hollow poppet valve 10 according to the first example described above, and are designated by the same reference signs, and accordingly, overlapping description thereof is omitted.

In the valve 10E of this sixth example, the plug 15D serving as a partition to separate the hollow portions S1' and S1" is made of the same material as heat-resistant steel that is the material of the valve 10E or a material having lower heat conductivity than the heat-resistant steel, so that heat to be transmitted from the hollow portion S1" can be further suppressed by the partition, and accordingly, an excellent heat insulation effect is obtained. In addition, the plug can be processed without coupling, a coupling step does not need to be newly provided, so that the step can be omitted.

Figure 8:
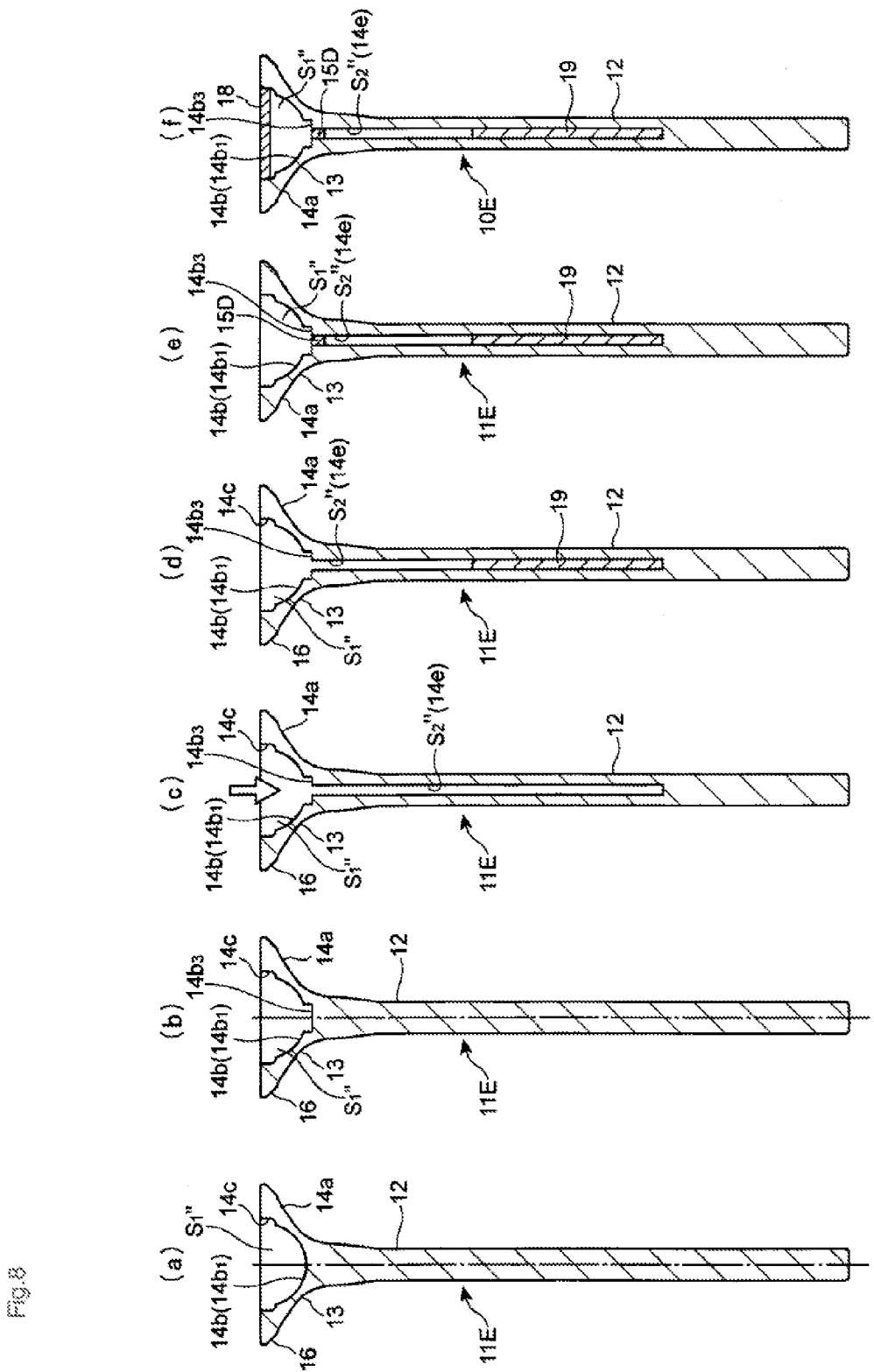
FIG. 8 are views showing steps of manufacturing the hollow poppet valve according to the sixth example, FIG. 8(*a*) shows a hot forging step of forging a shell as a valve intermediate product, FIG. 8(*b*) shows a step of forming a stepped flat portion on a bottom surface of a spherical recess of a head portion shell (upper end surface of a large-diameter hollow portion) (stepped flat portion forming step), FIG. 8(*c*) shows a boring step of boring a hole equivalent to a small-diameter hollow portion from the bottom surface of the recess of the head portion shell (upper end surface of the large-diameter hollow portion) to the stem portion, FIG. 8(*d*) shows a coolant loading step of filling the small-diameter hollow portion with a coolant from the recess side of the head portion shell, FIG. 8(*e*) shows a step of press-fitting and joining a plug to an opening of the small-diameter hollow portion by brazing, etc. (small-diameter hollow portion sealing step), and FIG. 8(*f*) shows a step of welding a cap to an opening-side inner circumferential surface of the recess (large-diameter hollow portion) of the head portion shell (large-diameter hollow portion sealing step).

Next, steps of manufacturing the hollow poppet valve 105 are described based on FIG. 8.

First, as shown in FIG. 8(a), through a hot forging step, the shell 11E in which the head portion shell 14a provided with the spherical recess 14b and the valve stem portion 12 are formed integrally with each other is formed.

Next, as shown in FIG. 3(b), in the vicinity of the vertex of the spherical surface of the large-diameter hollow portion S1", a stepped flat portion 14b3 is formed by cutting, etc. (stepped flat portion forming step).

Next, as shown in FIG. 8(c), the shell 11B is disposed so that the recess 14b of the head portion shell 14a turns upward, and a circular hole 14e equivalent to the small-diameter hollow portion S2" is bored by drilling from the stepped flat portion 14b3 on the recess 14b side of the head portion shell 14a to the valve stem portion 12 (boring step). Through the boring step, the recess 14b of the head portion shell 14a constituting the large-diameter hollow portion S" and the circular hole 14e on the valve, stem portion 12 side constituting the small-diameter hollow portion S2" are made to communicate with each other. In this boring step, drilling can be performed from the stepped flat portion 14b3, so that the circular hole 14e can be accurately and easily bored.

Next, as shown in FIG. 8(d), the circular hole 14e of the recess 14b of the head portion shell 14a of the shell 11B is filled with a predetermined amount of the coolant (solid) 19 (coolant loading step).

Next, as shown in FIG. 8(e), the small-diameter hollow portion S2" is sealed by press-fitting and fixing brazing a plug 15B into the opening of the hole 14e inside the recess 14b of the head portion shell 14a under an argon gas atmosphere.

Last, as shown in FIG. 8(f), under an argon gas atmosphere, the cap 18 is joined to the recess 14b of the head portion shell 14a, and then, machining to form a cotter groove on the stem end portion is performed, and accordingly, the valve 10E is completed.

REFERENCE SIGN LIST 10, 10A, 10B, 10C, 100, 10E: Hollow poppet valve
11, 11A, 11B, 11C, 11D, 11E: Shell as valve intermediate product in which head portion shell and stem portion are integrally formed
12: Valve stem portion
12a: Stem portion of shell
14: Valve head portion
14a: Head portion shell
14b: Recess of head portion shell
14b1: Upper end surface of large-diameter hollow portion
14b2: Tapered outer circumferential surface of large-diameter hollow portion
14b3: Stepped flat portion
15, 15A, 15B, 5D: Partition
15E: Plug (columnar body) constituting partition
17: Stepped portion
18: Cap
19: Coolant
21: Heat insulating layer
L: Central axis of valve
S1, S1', S1": Head-side hollow portion (large-diameter hollow portion) having truncated cone shape
S2, S2', S2": Linear stem-side hollow portion (small-diameter hollow portion)
S21: Small-diameter hollow portion close to stem end portion
S22: Small-diameter hollow portion close to head portion

The invention claimed is:

1. A hollow poppet valve in which a head portion is formed integrally with one end side of a stem portion, a head-side hollow portion and a stem-side hollow portion separated from each other by a partition provided at a position corresponding to a fillet portion between a valve head portion and a valve stem portion are formed, the head-side hollow portion is formed by the partition, a spherical recess of a head portion shell, and a cap member defining a bottom surface of the head-side hollow portion on a combustion chamber side of the head portion, in the head-side hollow portion, a heat insulating portion containing a gas or a material having lower heat conductivity than a valve forming metal is configured, and in the stem-side hollow portion, a cooling portion loaded with a coolant is configured, wherein a heat insulation effect is obtained at the heat insulating portion, a heat dissipation effect is obtained at the cooling portion, and by setting at least one of a position in the up-down direction and a length in the up-down direction of the partition, relative values of the heat insulation effect and the heat dissipation effect can be adjusted.

2. A method for adjusting relative values of a heat insulation effect and a heat dissipation effect of a hollow poppet valve in which a head portion is formed integrally with one end side of a stem portion, a head-side hollow portion and a stem-side hollow portion separated from each other by a partition provided at a position corresponding to a fillet portion between a valve head portion and a valve stem portion are formed, the head-side hollow portion is formed by the partition, a spherical recess of a head portion shell, and a cap member defining a bottom surface of the head-side hollow portion on a combustion chamber side of the head portion, in the head-side hollow portion, a heat insulating portion that exerts the heat insulation effect by containing a gas or a material having lower heat conductivity than a valve forming metal is configured, and in the stem-side hollow portion, a cooling portion that exerts the heat dissipation effect by being loaded with a coolant is configured, wherein relative values of the heat insulation effect and the heat dissipation effect are adjusted by setting at least one of a position in the up-down direction and a length in the up-down direction of the partition.

\* \* \* \* \*